(12) United States Patent
Franganillo et al.

(10) Patent No.: US 9,944,319 B2
(45) Date of Patent: Apr. 17, 2018

(54) MOTOR VEHICLE SYSTEM AND METHOD

(71) Applicant: JAGUAR LAND ROVER LIMITED, Warwickshire (GB)

(72) Inventors: Diana Franganillo, Coventry (GB); Steven Clugston, Coventry (GB); Kevin Cockings, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 125 days.

(21) Appl. No.: 14/763,607

(22) PCT Filed: Jan. 28, 2014

(86) PCT No.: PCT/EP2014/051654
§ 371 (c)(1),
(2) Date: Jul. 27, 2015

(87) PCT Pub. No.: WO2014/114813
PCT Pub. Date: Jul. 31, 2014

(65) Prior Publication Data
US 2015/0353132 A1 Dec. 10, 2015

(30) Foreign Application Priority Data
Jan. 28, 2013 (GB) .................................. 1301433.7

(51) Int. Cl.
*B62D 15/02* (2006.01)
*B60Q 9/00* (2006.01)
*G01S 15/93* (2006.01)

(52) U.S. Cl.
CPC ........... *B62D 15/029* (2013.01); *B60Q 9/006* (2013.01); *B60Q 9/007* (2013.01); *B62D 15/028* (2013.01);
(Continued)

(58) Field of Classification Search
CPC ............... B62D 15/029; B62D 15/028; B62D 15/0275; B62D 15/0295; B60Q 9/007;
(Continued)

(56) References Cited

U.S. PATENT DOCUMENTS 5,251,680 A * 10/1993 Minezawa ......... B60K 31/0008
180/169
5,467,283 A 11/1995 Butsuen et al.
(Continued)

FOREIGN PATENT DOCUMENTS

EP 0464821 A1 1/1992
EP 2528330 A1 11/2012
(Continued)

OTHER PUBLICATIONS

PCT International Search Report for International application No. PCT/EP2014/051654 dated Jun. 2, 2014.
(Continued)

*Primary Examiner* — Jerrah Edwards
*Assistant Examiner* — Majdi Alsomiri
(74) *Attorney, Agent, or Firm* — Carlson, Gaskey & Olds

(57) ABSTRACT

Embodiments of the invention provide a motor vehicle system, the system being operable to provide that provides a visual indication of the position relative to the vehicle of one or more obstacles that lie in the vicinity of the vehicle, predicts a path of a vehicle by reference to a position of a steering wheel or steerable road wheel of the vehicle, and determines whether any obstacles in the vicinity of the vehicle lie in the predicted path by reference to data regarding the location of such obstacles. If the system determines that one or more obstacles lie in the predicted path the system provides an audible indication of a distance any such obstacles from the vehicle according to a distance from the vehicle.

18 Claims, 5 Drawing Sheets

(52) U.S. Cl.
CPC ..... *B62D 15/0275* (2013.01); *B62D 15/0295* (2013.01); *B60T 2201/10* (2013.01); *G01S 2015/932* (2013.01)

(58) Field of Classification Search
CPC .............. B60Q 9/006; G01S 2015/932; B60T 2201/10
See application file for complete search history.

(56) References Cited

U.S. PATENT DOCUMENTS

| | | | | |
|---|---|---|---|---|
| 5,477,461 | A | * | 12/1995 | Waffler ................. G01S 17/936 180/169 |
| 5,479,173 | A | * | 12/1995 | Yoshioka ................. B60T 7/22 342/70 |
| 5,689,264 | A | * | 11/1997 | Ishikawa ............... G01S 17/936 342/70 |
| 5,751,211 | A | * | 5/1998 | Shirai .................... B60K 28/10 180/169 |
| 6,150,932 | A | * | 11/2000 | Kenue ................ B60K 31/0008 340/435 |
| 2005/0195071 | A1 | | 9/2005 | Ewerhart et al. |
| 2008/0122604 | A1 | | 5/2008 | Hattori et al. |
| 2013/0190944 | A1 | * | 7/2013 | Brandin ................. G01C 21/26 701/1 |
| 2014/0203925 | A1 | * | 7/2014 | Augst .................... B60Q 9/007 340/435 |

FOREIGN PATENT DOCUMENTS

| | | |
|---|---|---|
| JP | 11-039598 A | 12/1999 |
| JP | 2000187799 A | 7/2000 |
| JP | 2001-315602 | 11/2001 |
| JP | 2005045602 A | 2/2005 |
| JP | 2005236540 A | 9/2005 |
| JP | 2006-168525 A | 6/2006 |

OTHER PUBLICATIONS

Combined Search and Examination Report under Sections 17 and 18(3) for Application No. GB1301433.7 dated Jul. 3, 2013.
Patent Office of the People's Republic of China, Supplementary Search Report for Application No. CN 20148006138.0 dated Mar. 2, 2017.

* cited by examiner

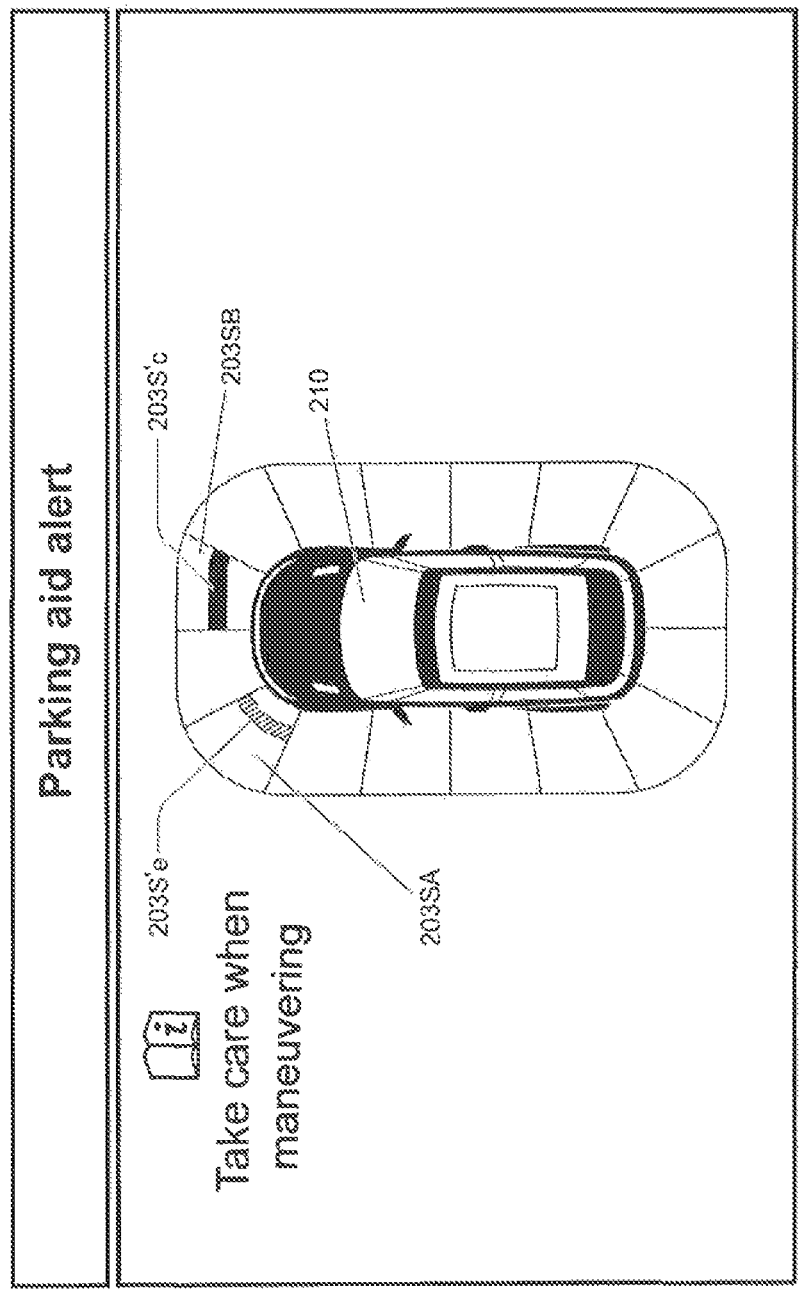

MOTOR VEHICLE SYSTEM AND METHOD

FIELD OF THE INVENTION

The present invention relates to motor vehicle systems for providing assistance to a driver driving a vehicle and to a method of assisting a driver to drive a vehicle. Aspects of the invention relate to an apparatus, to a system, to a method and to a vehicle.

BACKGROUND

It is known to provide a parking aid system for aiding a driver to park a vehicle and to negotiate obstacles in confined areas such as car parks, avoiding collision with obstacles in a vicinity of the vehicle.

It is an aim of embodiments of the invention to provide improved assistance to a driver driving a vehicle.

STATEMENT OF THE INVENTION

Embodiments of the invention may be understood with reference to the appended claims.

Aspects of the present invention provide an apparatus, a system, a vehicle and a method.

According to one aspect of the invention, there is provided a system operable to provide a visual indication to a driver of the vehicle of the position relative to the vehicle of one or more obstacles that lie in the vicinity of the vehicle;
  to predict a path of a vehicle by reference to a position of a steering wheel or steerable road wheel of the vehicle; and
  to determine whether any obstacles in the vicinity of the vehicle lie in the predicted path by reference to data in respect of the location of such obstacles;
  wherein if the system determines that one or more obstacles lie in the predicted path, the system is operable to provide an audible indication to a driver of the vehicle of a distance of one or more obstacles from the vehicle according to a distance from the vehicle of an obstacle that lies in the predicted path.

Thus, the system may provide a driver with improved situational awareness when performing a maneuver, such as parking. In particular, the system may provide more relevant information to a driver of a vehicle compared to known parking aid systems. In the case of the present invention, and audible indicator is only provided in respect of and object which is determined to lie in the predicted path. Audible indicators of objects determined not to lie in the predicted path and which, therefore, may not represent a collision risk, may be inhibited. However, by means of visual indications, the driver is able to remain aware of objects which lie outside of the predicted path but which are in the vicinity of the vehicle and thus, which may represent a collision risk in the event that the predicted path changes. The system may be operable to provide a visual indication of objects in an area surrounding the vehicle, i.e. in a 360 degree radius around the vehicle.

The system may be operable to determine the predicted path by further reference to a selected gear and/or a direction of rotation of one or more road wheels of the vehicle. The system may be operable to predict the path of the vehicle during motion of the vehicle over a surface.

The system may be operable to provide the visual indication by means of a visual display panel.

The system may be operable to provide different respective visual indications of respective obstacles wherein an obstacle that does not lie in the predicted path is represented on the display panel by at least one selected from amongst a different colour, a different brightness and a different iconic form to an obstacle that does lie in the predicted path.

The system may be operable to provide the audible indication by means of an audio transducer.

The system may be operable to provide a visual indication of the relative position with respect to the vehicle of an obstacle on the display panel by means of the relative position of a representation of the obstacle and a reference location of the display corresponding to the location of the vehicle.

The system may be operable to provide a visual indication of the distance of one or more obstacles from the vehicle by reference to one selected from amongst a colour, a brightness and an iconic form of a representation of the obstacle on the screen.

The system may be operable to provide a visual indication of a distance from the vehicle of an obstacle that lies in the predicted path of the vehicle and not an object that does not lie in the predicted path.

The system may be operable when the vehicle is moving in a forward direction only when a speed of the vehicle does not exceed a prescribed value.

According to a further aspect of the invention, there is provided a system operable to predict a path of a vehicle by reference to a position of a steering wheel or steerable road wheel of the vehicle; and
  to determine whether any obstacles in the vicinity of the vehicle lie in the predicted path by reference to data in respect of the location of such obstacles;
  wherein if the system determines that one or more obstacles lie in the predicted path, the system is operable to provide an audible indication to a driver of the vehicle of a distance of one or more obstacles from the vehicle according to a distance from the vehicle of an obstacle that lies in the predicted path.

According to another aspect of the invention, there is provided a method comprising:
  predicting a path of a motor vehicle by reference to a position of a steering wheel or steerable road wheel of the vehicle;
  determining whether obstacles in the vicinity of the vehicle lie in the predicted path by reference to data in respect of the location of such obstacles; and
  if it is determined that one or more obstacles lie in the predicted path, providing an audible indication thereof to a driver of the vehicle.

The method may comprise inhibiting an audible indication in respect of an object which is determined to not lie within the predicted path.

The method may comprise predicting the vehicle path by further reference to a selected gear and/or a direction of rotation of one or more road wheels of the vehicle.

In one aspect of the invention for which protection is sought there is provided a motor vehicle system, the system being operable to predict a path of the vehicle during motion of the vehicle over a surface by reference to a position of a steering wheel or steerable road wheel of the vehicle and to determine whether any obstacles in the vicinity of the vehicle lie in the predicted path by reference to data in respect of the location of such obstacles, wherein if the system determines that one or more obstacles do lie in the predicted path the system is operable to provide automatically a corresponding indication to a driver of the vehicle.

The system may be operable to predict the vehicle path by further reference to a selected gear and/or a direction of rotation of one or more road wheels of the vehicle.

Some embodiments of the present invention have the advantage that because the system is able to predict the path of the vehicle, the system may provide the driver of the vehicle with more relevant information about obstacles in the vicinity of the vehicle.

Some embodiments of the present invention provide a useful parking aid for aiding a driver in parking a vehicle.

It is to be understood that known parking aid systems are not able to predict vehicle path and therefore provide obstacle presence indications regardless of whether a risk exists that the vehicle may collide with the obstacle if the vehicle continues its current path. This has the disadvantage that a driver can become overwhelmed or otherwise confused by information provided to him or her. Parking a vehicle can be a stressful operation requiring a high level of concentration and it is desirable to reduce the amount of information provided to a driver that is not directly relevant to the parking operation.

Some embodiments of the present invention have the advantage that if an obstacle is detected that does not lie in a predicted path of the vehicle, the system may provide a different indication (or no indication) in respect of the presence of that obstacle compared with a situation in which an obstacle is found to lie in a predicted path of the vehicle.

Advantageously the system may be operable to provide an indication to a driver in respect of the presence of one or more obstacles that do lie in the predicted path of the vehicle and an indication in respect of one or more obstacles that do not lie in the predicted path.

The system may be operable to provide the corresponding indication by means of a visual display panel.

Advantageously the system may be operable to provide different respective visual indications of respective obstacles wherein an obstacle that does not lie in the predicted path is represented on the display panel by at least one selected from amongst a different colour, a different brightness and a different iconic form to an obstacle that does lie in the predicted path.

Thus for example in some embodiments all obstacles may be represented by different respective colours of a panel or portion thereof, different coloured icons or any other suitable means. Thus it may be determined whether an obstacle is within or outside the vehicle path by means of colour, brightness and/or iconic form.

Other arrangements are also useful.

The system may be operable to provide the corresponding indication by means of an audio transducer.

The system may be operable to provide a visual and/or audible indication to a driver of a position relative to the vehicle of an obstacle that does lie in the predicted path.

The system may be operable to provide a visual and/or audible indication to a driver of a position relative to the vehicle of an obstacle that does not lie in the predicted path.

Thus it is to be understood that the system may be operable to provide different visual and/or audible indications in respect of the location of respective obstacles according to the determination whether or not an obstacle lies in the predicted path of the vehicle.

Advantageously the system may be operable to provide a visual indication of the relative position with respect to the vehicle of an obstacle on the display panel by means of the relative position of a representation of the obstacle and a reference location of the display corresponding to the location of the vehicle.

Thus in some embodiments the display may be operable to display the position of one or more obstacles on an electronic screen of the display panel relative to a reference location. The reference location may be a location on the screen or other portion of the display. It is to be understood that the display panel may comprise an electronic screen and one or more panel members or other features within or on one or more sides of the screen. Thus the reference location may optionally be on one of the one or more panel members and not the screen itself.

The representation may be in the form of a coloured or greyscale shaded ('greyscale coloured') portion such as a rectangular box, or other shaped box.

The system may be operable to provide a visual or audible indication of a distance of one or more obstacles from the vehicle.

The system may be further operable to provide a visual indication of the distance of one or more obstacles from the vehicle by reference to one selected from amongst a colour, a brightness and an iconic form of a representation of the obstacle on the screen.

The visual indication in respect of distance may be provided by reference to a distance on a display between a representation of the obstacle and a reference position corresponding to a position of the vehicle. Alternatively an indication of the measured distance in actual or arbitrary units may be provided, for example '10 m', '5 m' or the like.

The system may be operable to provide a visual indication of a distance from the vehicle of an obstacle that lies in the predicted path of the vehicle and not an object that does not lie in the predicted path.

Optionally the system may be operable to provide an audible indication of a distance of one or more obstacles from the vehicle according to a distance from the vehicle of an obstacle that lies in the predicted path.

The system may be operable when the vehicle is moving in a forward direction only when a speed of the vehicle does not exceed a prescribed value.

This feature is advantageous in cases where the system is adapted for providing assistance during low speed maneuvers.

In an aspect of the invention for which protection is sought there is provided a parking aid system comprising a system according to the preceding aspect.

In an aspect of the invention for which protection is sought there is provided a motor vehicle comprising a system according to any preceding aspect.

Advantageously the system may be operable to determine a collision risk potential between the vehicle and an obstacle in a path of the vehicle, the system being operable to command actuation of at least one vehicle system in dependence on the collision risk potential.

It is to be understood that the system may be operable to trigger an action in response to a value of a collision risk potential thereby to reduce a risk of collision with the obstacle.

Advantageously the system may be operable to command actuation of at least one selected from amongst a vehicle braking system, a vehicle powertrain and a vehicle steering system in dependence on the collision risk potential.

Thus in some embodiments the system may be operable to command application of a braking system, a reduction in drive torque to one or more wheels and/or a change in steerable road wheel angle in response to the value of the collision risk potential. Other arrangements are also useful.

In a further aspect of the invention for which protection is sought there is provided a method implemented by means of a motor vehicle system, comprising: predicting a path of the vehicle by reference to a position of a steering wheel or steerable road wheel of the vehicle, and determining whether obstacles in the vicinity of the vehicle lie in the predicted path by reference to data in respect of the location of such obstacles, whereby if the system determines that one or more obstacles do lie in the predicted path the method comprises providing automatically a corresponding indication to a driver of the vehicle.

The method may comprise predicting vehicle path by further reference to a selected gear and/or a direction of rotation of one or more road wheels of the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying figures in which.

DETAILED DESCRIPTION

Figure 1:
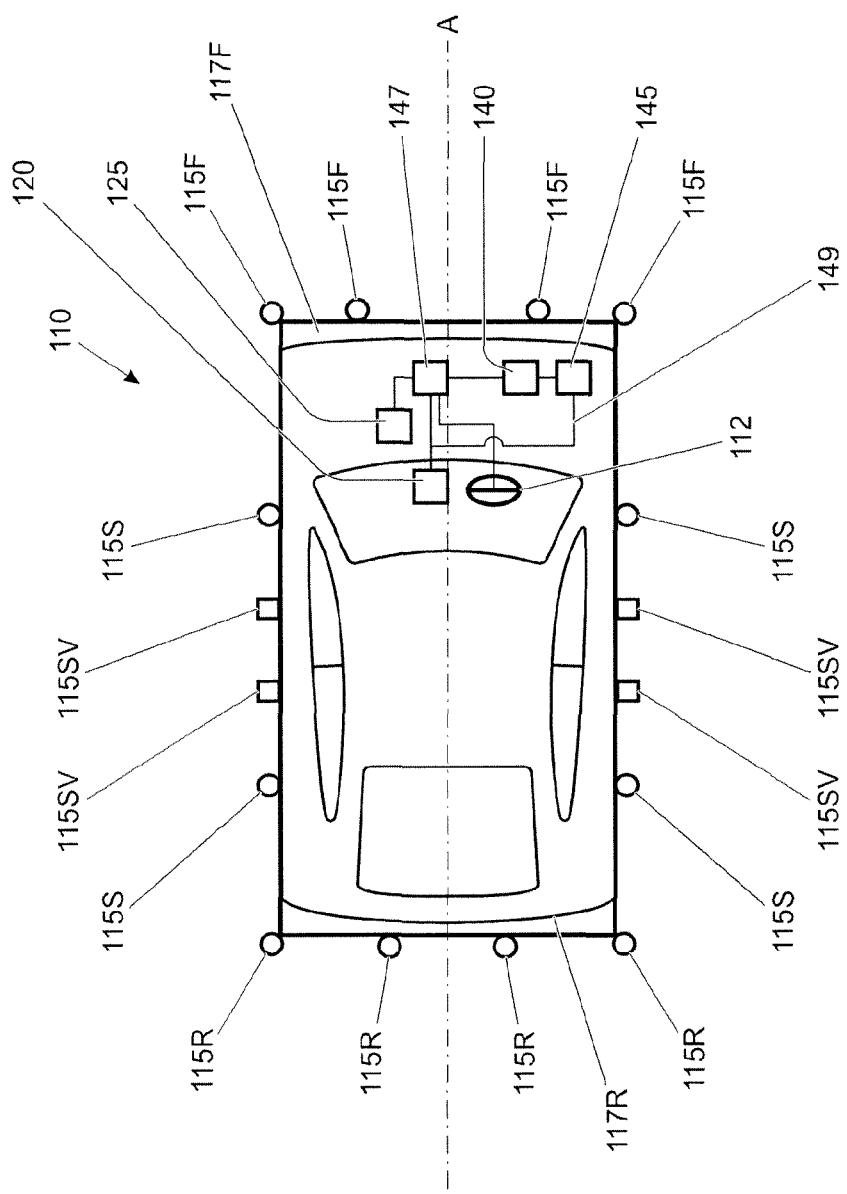
FIG. 1 is a schematic illustration showing a vehicle having a parking aid system according to an embodiment of the present invention.

Embodiments of the present invention are directed to a parking aid system for installation in a motor vehicle. FIG. 1 shows a vehicle 110 having a parking aid system according to an embodiment of the present invention installed therein.

The system includes a parking aid system (PAS) controller 140 arranged to receive data from a sensor module 145 and a vehicle controller 147.

The sensor module 145 is connected to ultrasonic transceivers positioned at respective locations around a periphery of the vehicle 110. In the embodiment shown in FIG. 1 four transceivers 115F are installed across a front bumper 117F, four transceivers 115R are installed across a rear bumper 117R and two transceivers 115S are provided at spaced apart locations along each of left and right sides of the vehicle 100. The sensor module 145 is arranged to detect the relative positions with respect to the vehicle 110 of obstacles within a given range of the vehicle 110 and to output to the controller 140 data indicative of the relative position of each obstacle and the distance of each obstacle from the vehicle 110.

In the present embodiment the PAS controller 140 is operable to process signals received from transceivers 115S along respective sides of the vehicle 110 so as effectively to establish two virtual transceivers 115SV between the transceivers 115S. The PAS controller 140 is operable to calculate a distance of obstacles detected by the transceivers 115S from the virtual transceivers 115SV as well as the 'real' transceivers 115S. In some arrangements the PAS controller 140 correlates signals received by respective pairs of transceivers 115S on each side of the vehicle in order to accomplish this. Consequently, four segments of the HMI display along each side of the vehicle may be controlled to represent obstacle distance from each of two real transceivers 115S and two virtual transceivers 115SV along each side of the vehicle 110. It is to be understood that other arrangements are also useful.

The vehicle controller 147 is arranged to output vehicle parameter data including data in respect of (1) a currently selected mode of operation of a transmission 125 of the vehicle 110; (2) a speed of the vehicle and (3) a rotational position of a steering wheel 112 of the vehicle 110 with respect to a reference position. In some embodiments the reference position corresponds to a neutral or 'straight' direction of travel of the vehicle 110 parallel to a longitudinal axis A of the vehicle 110. The vehicle controller 147 may output further information in addition or instead in some embodiments.

In the present embodiment the controller 147 outputs data to a controller area network (CAN) bus 149 by means of which devices connected to the CAN bus 149 including controllers 140, 145, 147 may communicate with one another.

The PAS controller 140 is configured to read data in respect of transmission mode, vehicle speed and a position of a steering wheel 112 from the CAN bus 149. The PAS controller 140 is configured to provide a parking aid service to a driver if the conditions are met that (1) the transmission is in a forward drive mode (such as 'drive') and the vehicle is travelling at a speed less than a threshold speed; or (2) the transmission is in a reverse drive mode. In the case of a vehicle having a manual transmission, instead of or in addition to checking whether a forward gear is selected the PAS controller 140 may check in which direction the vehicle is moving in order to determine whether the parking aid service is to be provided. Such service will not be provided if the vehicle is moving in a forward direction at a speed exceeding a prescribed speed.

Figure 2:
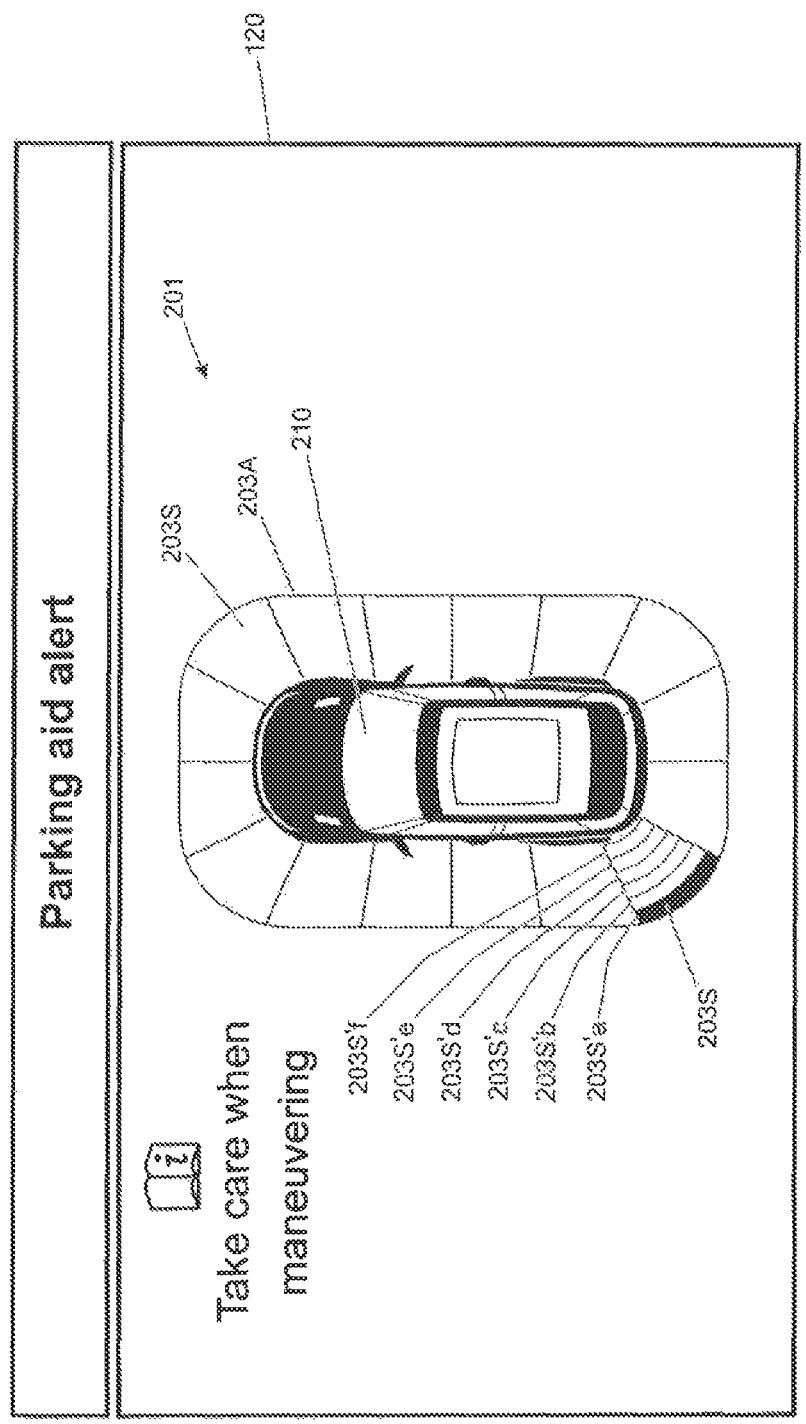
FIG. 2 is a schematic illustration of a screenshot of a display screen of the vehicle of FIG. 1 during operation of a parking aid system according to an embodiment of the present invention.

In the embodiment of FIG. 1, when parking aid service is being provided the PAS controller 140 is arranged to display a graphic 201 on a human machine interface (HMI) display screen 120 representative of the vehicle 110 being driven and its immediate surroundings. The graphic is shown schematically in FIG. 2. In FIG. 2 the graphic is shown in a reverse black and white representation in order to aid reproduction for the purposes of the present application. The graphic includes a representation of the vehicle 210 and of an area 203A immediately surrounding the vehicle, the area 203A on the screen 120 having a boundary a substantially constant distance from the representation of the vehicle 210 around the vehicle 210. The area 203A is divided into sixteen segments 203S each having a boundary extending substantially radially from the vehicle 210, each segment 203S having a similar dimension along a radially outer boundary of the area 203A. In the embodiment shown each segment corresponds to an ultrasonic transceiver (real or virtual). It is to be understood that other numbers of segments are also useful. Similarly, other numbers of sensors (real or virtual) are also useful.

Each segment 203S is divided into six further sub-segments 203S', each sub-segment 203S' being located a different distance from the representation of the vehicle 210.

Each sub-segment 203S' may be illuminated individually in either a prescribed colour or a prescribed greyscale shading. In the present embodiment, the two radially outermost sub-segments 203S'a, 203S'b may each be illuminated in yellow, the next two radially adjacent inner sub-segments 203S'c and 203S'd may each be illuminated in orange and the two radially innermost segments 203S'e, 203S'f may each be illuminated in red. It is to be understood that other colour schemes are also useful.

The sub-segments 203S' may also be illuminated in respective greyscale shades, ranging from a relatively light shade for the outermost pair 203S'a, 203S'b, a medium shade for the middle pair 203S'c, 203S'd and a relatively dark shade for the innermost pair 203S'e, 203S'f.

The PAS controller 140 is operable to illuminate sub-segments 203S' of the display screen 120 according to the data received from the sensor module 145 in respect of the relative positions of obstacles external to the vehicle 110. The PAS controller 140 illuminates a sub-segment 203S' of a given segment 203S when an obstacle is determined to have at least a portion thereof at a location that has a bearing from the vehicle corresponding to that of the segment 203S. The controller 140 illuminates a particular sub-segment 203S' according to the distance of the nearest object or portion thereof having a bearing within that defined by the particular segment 203S. The closer the nearest obstacle is to the vehicle 110, the closer the corresponding sub-segment 203S' to the representation of the vehicle 210 that is illuminated by the PAS controller 140.

In the screenshot of FIG. 2, the vehicle 110 is reversing with full left turn wheel-lock, and an obstacle is located behind and to the left of the vehicle 110 within an area corresponding to that defined by the highlighted segment 203S. The sensor module 145 has detected the presence of the obstacle and the PAS controller 140 has determined that the obstacle lies within the path of the vehicle 110 as it reverses. The PAS controller 140 has also determined that the current distance of the obstacle from the vehicle 110 corresponds to that requiring illumination of the outermost sub-segment 203S'a. This segment 203S'a has therefore been illuminated in yellow. If the vehicle continues to reverse, the PAS controller 140 may successively illuminate sub-segments 203S'a to 203S'f as the vehicle 110 approaches the obstacle. If the vehicle 110 continues reversing along the same path after innermost segment 203S'f has become illuminated (in red), collision with the obstacle is likely to occur.

Figure 3:
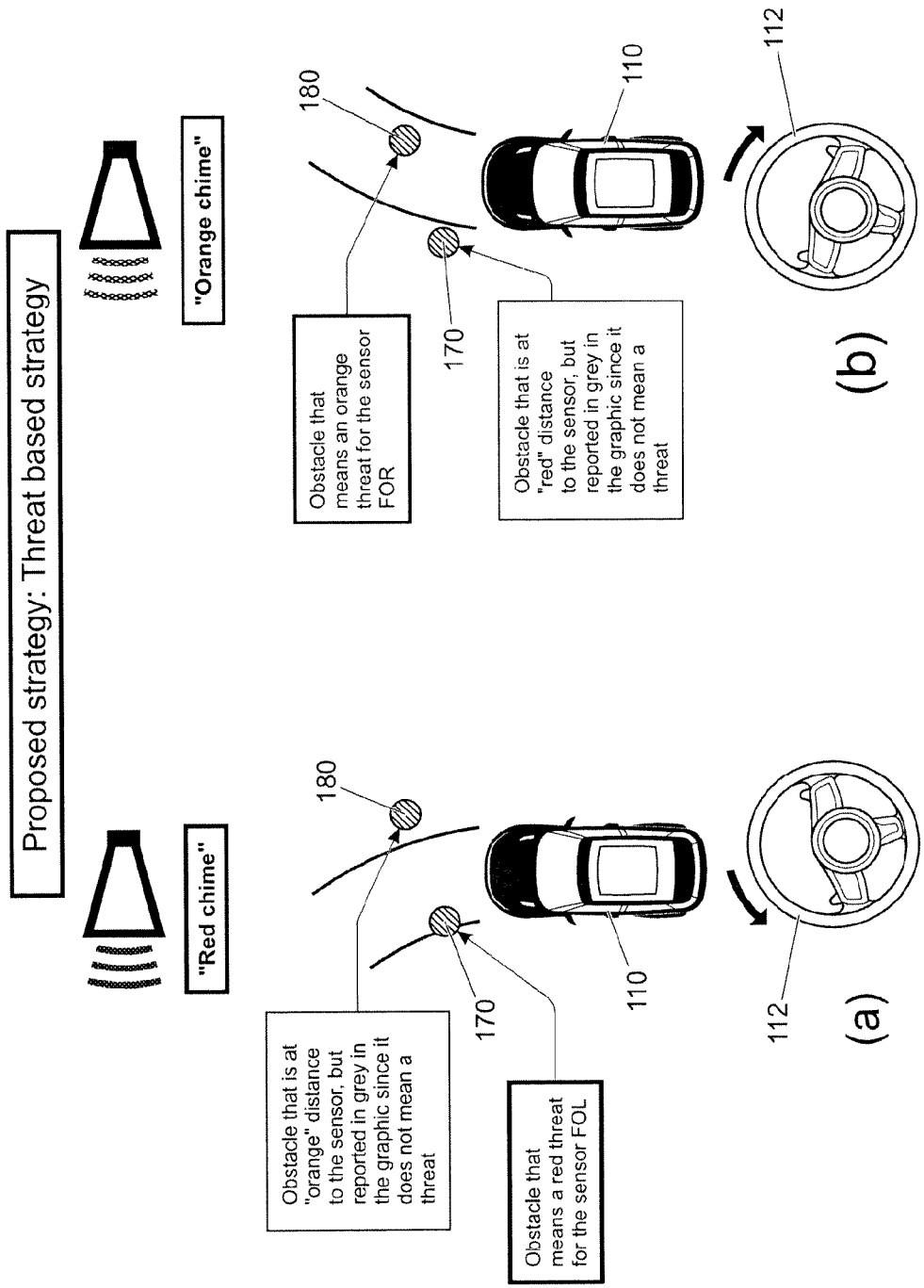
FIG. 3 is a schematic illustration of two scenarios in which a parking aid system is operational whilst the vehicle is moving forward with the steering wheel turned (a) to the left and (b) to the right.

FIG. 3 illustrates operation of the PAS controller 140 for a vehicle 110 in two different scenarios. In each scenario the vehicle 110 is shown in the same location with two obstacles 170, 180 ahead of the vehicle 110. In the scenario of FIG. 3(a) the vehicle 110 is moving at a speed of 5 km/h in a forward direction with the steering wheel turned anticlockwise with respect to a neutral or straight forward position. In the scenario of FIG. 3(b) the vehicle 110 is moving forward at the same speed with the steering wheel turned clockwise with respect to the neutral position.

Figure 4A:
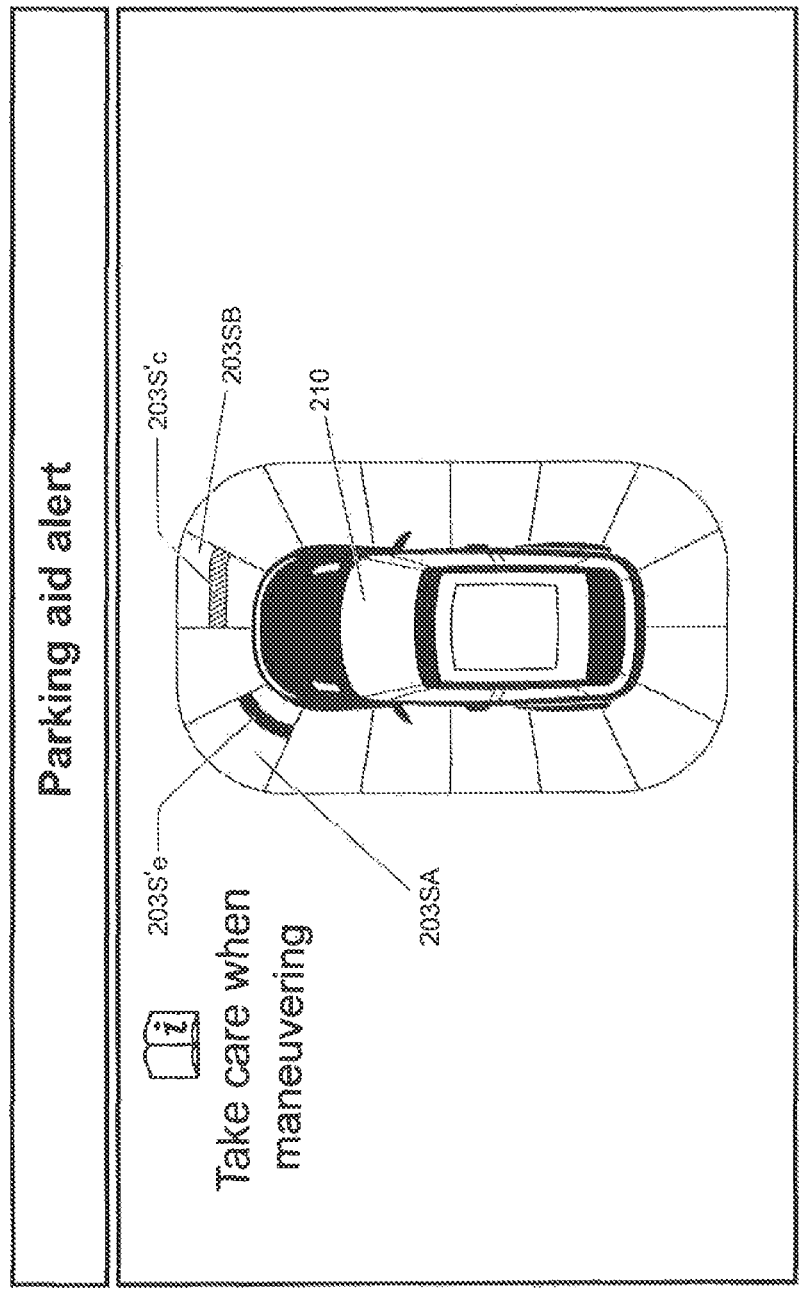
FIG. 4 is a schematic illustration of screenshots of the display of the vehicle of FIG. 1 corresponding to the scenarios of (a) FIGS. 3(a) and (b) FIG. 3(b).

It can be seen from FIG. 3(a) that in the scenario represented the vehicle 110 has a predicted path that includes obstacle 170 but not obstacle 180, obstacle 170 being closer to the vehicle 110 than obstacle 180. FIG. 4(a) is a schematic illustration of a display provided on the display screen 120 of the vehicle 110 in the scenario of FIG. 3(a). The sensor module 145 has detected the presence of both obstacles 170, 180. In response to data received by the PAS controller 140 from the sensor module 145, the PAS controller 140 has determined that the distance of obstacle 170 from the vehicle 110 corresponds to that for which a sub-segment 203S'e of segment 203SA of graphic 201 should be illuminated and that of obstacle 180 corresponds to that for which a sub-segment 203S'c of segment 203SB should be illuminated.

In response to relative bearing data in respect of the obstacles 170, 180 the PAS controller 140 has triggered illumination of sub-segment 203S'e of segment 203SA (in a red colour) in respect of obstacle 170 (because this obstacle 170 lies in the predicted path) and sub-segment 203S'c of segment 203SB (in a medium greyscale) in respect of obstacle 180 (because this obstacle 180 does not lie in the predicted path). An audible chime is also sounded by the PAS controller 140, audible to a driver of the vehicle 110, in respect of the closest obstacle in the vehicle's path. In the scenario of FIG. 3(a) the chime indicates that an obstacle (obstacle 170) in the path of the vehicle 110 is at a 'red' (i.e. particularly close) distance from the vehicle 110, in accordance with the colour (red) in which sub-segment 203S'e of segment 203SA is illuminated. It is to be understood that in the present embodiment the same characteristic chime is sounded for obstacles at distances from the vehicle 110 corresponding to sub-segment 203S'f and 203S'e, both of which are 'red' distances in that the sub-segments 203S'f, 203S'e are illuminated in red.

If obstacles are detected at distances corresponding to 'orange' distances 203S'c or 203S'd, a corresponding chime different from that of a red distances is sounded.

If obstacles are detected at distances corresponding to 'yellow' distance 203S'a or 203S'b, a corresponding chime different from that of red or orange distances is sounded. A driver can therefore determine the approximate distance of an obstacle in the vehicle's path without looking at the display screen 120. This may be particularly useful when the driver is unable to view the display screen, for example while looking over their shoulder during a reversing maneuver.

In the scenario of FIG. 3(b) the vehicle 110 has a predicted path that includes obstacle 180 but not obstacle 170. Accordingly, the PAS controller 140 generates a display on display screen 120 as shown in FIG. 4(b). The PAS controller 140 has triggered illumination of sub-segment 203S'e of segment 203SA in respect of obstacle 170 in a relatively dark greyscale compared with that of sub-segment S203S'c in FIG. 4(a). The PAS controller 140 has also triggered illumination of sub-segment 203S'c of segment 203SB in respect of obstacle 180 in an orange colour. An audible chime is also sounded by the PAS controller 140 indicating that an obstacle (obstacle 180) in the path of the vehicle 110 is at an orange distance from the vehicle 110, in accordance with the colour (orange) in which sub-segment 203S'c of segment 203SB is illuminated.

It is to be understood that in the present embodiment the audible chime provided to the driver is provided in respect of the nearest obstacle in the vehicle path and not the nearest obstacle regardless of vehicle path. This may help to reduce driver confusion and aid the driver in focusing his or her attention on obstacles that do lie in the vehicle path. In some alternative embodiments the audible chime may be provided in respect of the nearest obstacle regardless of vehicle path. Other arrangements are also useful.

Embodiments of the present invention have the advantage that, whilst a driver may be made aware of the presence of obstacles in a vicinity that are not in a predicted path of the vehicle 110 (by greyscale shading of a sub-segment corresponding to those obstacles) the driver's attention may be directed primarily to obstacles that do lie in the predicted path, by virtue of their being displayed in a colour as to greyscale (or other suitable means for distinguishing obstacle types) and optionally with an appropriate audible chime. It is to be understood that the greyscale representation of objects not in the predicted path can be helpful in enabling a driver to determine correctly a correspondence between objects in the vehicle's path that are visible to the driver from his driving position and representations of those objects on the screen 120, since the obstacles represented in greyscale provide additional reference obstacles for driver orientation.

It is to be understood that whilst the presence of objects not in the vehicle's predicted path may be represented by greyscale shading, other representations are also useful in addition or instead, such as by means of non-greyscale colours, icons or any other suitable means. Similarly, the presence of objects that are in the vehicle's predicted path may be represented by other means in addition or instead, such as by means of greyscale colours, icons or any other suitable means.

Embodiments of the present invention have the advantage that they may enhance a user's situational awareness and provide an improved experience for the user.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system for providing assistance during low speed manoeuvres, the system being operable to provide a driver of a vehicle a visual indication of the position and distance relative to the vehicle of one or more obstacles in a vicinity of the vehicle, the system comprising:
    at least one sensor configured to detect an obstacle in the vicinity of the vehicle;
    a visual display panel; and
    a controller configured to
        predict a path of the vehicle by reference to a position of a steering wheel or a steerable road wheel of the vehicle; and
        determine whether any obstacles in the vicinity of the vehicle lie in the predicted path by reference to data regarding the location of such obstacles;
        wherein if the controller determines that one or more obstacles in the vicinity of the vehicle lie in the predicted path, the system is operable to provide to the driver of the vehicle an audible indication of a distance from the vehicle of one or more obstacles that lie in the predicted path according to a distance from the vehicle of an obstacle that lies in the predicted path;
        wherein the system is operable to not provide an audible indication of a distance from the vehicle of one or more obstacles in the vicinity of the vehicle that are determined not to lie in the predicted path;
        wherein the controller causes the visual display panel to provide a visual indication of the relative position and distance from the vehicle of each obstacle in the vicinity of the vehicle determined not to lie in the predicted path; and
        wherein the system is operable to provide the audible and visual indications when the vehicle is moving in a forward direction only when a speed of the vehicle does not exceed a prescribed value.

2. A system as claimed in claim 1, wherein the controller is configured to determine the predicted path by further reference to a selected gear and/or a direction of rotation of one or more road wheels of the vehicle.

3. A system as claimed in claim 1, wherein the controller is configured to provide different respective visual indications of respective obstacles based upon whether an obstacle lies in the predicted path, wherein the visual indication of an obstacle represented on the display panel includes at least one selected from among a color, a brightness and an iconic form that is different for an obstacle in the predicted path compared to an obstacle that is not in the predicted path.

4. A system as claimed in claim 1, comprising an audio transducer to provide the audible indication.

5. A system as claimed in claim 1, wherein the controller is configured to provide the visual indication of a relative position with respect to the vehicle of an obstacle on the display panel by a relative position of a representation of the obstacle and a reference location of the display corresponding to the location of the vehicle.

6. A system as claimed in claim 1, wherein the controller is configured to provide the visual indication of the distance of the one or more obstacles from the vehicle using at least one selected from among a color, a brightness and an iconic form of a representation of the obstacle on the screen.

7. A system as claimed in claim 6, wherein the controller is configured to provide a visual indication of a distance from the vehicle of an obstacle in the vicinity of the vehicle that lies in the predicted path.

8. A parking aid system comprising a system as claimed in claim 1.

9. A motor vehicle comprising a system as claimed in claim 1.

10. A motor vehicle as claimed in claim 9, wherein the controller is configured to determine a collision risk potential between the vehicle and an obstacle in the path of the vehicle, the controller being operable to command actuation of at least one vehicle system in dependence on the collision risk potential.

11. A motor vehicle as claimed in claim 10, wherein the controller is configured to command actuation of at least one selected from among a vehicle braking system, a component of a vehicle powertrain and a vehicle steering system in dependence on the collision risk potential.

12. A method for providing assistance during a low speed manoeuvre, the method comprising:
    predicting a path of the vehicle by reference to a position of a steering wheel or a steerable road wheel of the vehicle;
    determining, based on an output of at least one sensor, whether obstacles in a vicinity of the vehicle lie in the predicted path by reference to data regarding a location of such obstacles;
    if it is determined that one or more obstacles in the vicinity of the vehicle lie in the predicted path, providing an audible indication to a driver of the vehicle of a distance from the vehicle of one or more obstacles determined to lie in the predicted path according to a distance from the vehicle of an obstacle that lies in the predicted path;

if it is determined that one or more obstacles in the vicinity of the vehicle do not lie in the predicted path, not providing an audible indication to the driver of the vehicle of the distance from the vehicle to one or more obstacles determined not to lie in the predicted path;

providing a visual indication on a display panel of the relative position and distance from the vehicle of each obstacle in the vicinity of the vehicle determined not to lie in the predicted path; and wherein the method is performed when the vehicle is moving in a forward direction only when a speed of the vehicle does not exceed a prescribed value.

13. A method as claimed in claim 12, comprising predicting the vehicle path by further reference to a selected gear and/or a direction of rotation of one or more road wheels of the vehicle.

14. A method as claimed in claim 12, comprising providing different respective visual indications of respective obstacles based upon whether an obstacle lies in the predicted path, wherein the visual indication of an obstacle represented on the display panel includes at least one selected from among a color, a brightness and an iconic form that is different for an obstacle in the predicted path compared to an obstacle that is not in the predicted path.

15. A method as claimed in claim 12, comprising providing the audible indication using an audio transducer.

16. A method as claimed in claim 12, comprising providing a visual indication of a relative position with respect to the vehicle of an obstacle on the display panel including a relative position of a representation of the obstacle and a reference location of the display corresponding to a location of the vehicle.

17. A method as claimed in claim 12, comprising providing the visual indication of the distance of the one or more obstacles from the vehicle including one selected from among a color, a brightness and an iconic form of a representation of the obstacle on the display screen.

18. A method as claimed in claim 12, comprising providing a visual indication of a distance from the vehicle of an obstacle in the vicinity of the vehicle that lies in the predicted path.

* * * * *